(12) United States Patent
Polcuch

(10) Patent No.: US 7,015,670 B2
(45) Date of Patent: Mar. 21, 2006

(54) METHOD OF CONTROLLING A HIGH-FRICTION ELECTRO-MECHANICAL SERVO-MECHANISM TO MINIMIZE THE POWER NEEDED TO HOLD A LOADED OUTPUT MEMBER

(75) Inventor: Eric A. Polcuch, San Pedro, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 10/845,626

(22) Filed: May 14, 2004

(65) Prior Publication Data

US 2005/0253548 A1    Nov. 17, 2005

(51) Int. Cl.
G05B 19/18    (2006.01)
G05B 11/01    (2006.01)

(52) U.S. Cl. .................. 318/632; 318/560; 318/614; 318/615; 318/626; 318/632; 318/493; 318/494; 318/495

(58) Field of Classification Search .............. 318/626, 318/628, 615, 560, 493, 494, 495
See application file for complete search history.

(56) References Cited

U.S. PATENT DOCUMENTS 3,805,137 A  *  4/1974  Fahmer ................ 318/636
3,906,327 A  *  9/1975  O'Callaghan et al. ...... 318/603

4,345,194 A  *  8/1982  Green ................... 318/621

(Continued)

*Primary Examiner*—David Martin
*Assistant Examiner*—Elias B. Hiruy
(74) *Attorney, Agent, or Firm*—Phillips Lytle LLP

(57) ABSTRACT

The invention provides a method for controlling an electro-mechanical servomechanism (20) for moving an output member relative to a variable load (38). The servomechanism includes: a motor (37) having at least one coil (32A, 32B or 32C) adapted to be supplied with current and having a rotor (33) with an output shaft (35); a mechanical transmission (36) arranged between the output shaft and the load, the transmission having a mechanical friction related to the load; a servoamplifier (30) arranged to supply current to the motor coil in response to an input signal (in line 29); a command signal (in line 21) for commanding the position of the load; a load position feedback signal (in line 23) compared (in summing point 22) to the command signal and arranged to produce an error signal (in line 24); and means (28) for generating an offset signal (in line 26) that is summed (in summing point 25) with the error signal to modify the servoamplifier input signal (in line 29). The improved method comprises the steps of: generating the offset signal as a function of the command and feedback signals and the currents supplied to the motor coil after the position of the output member as remained substantially constant for a predetermined time; and adjusting the offset signal so that the motor current is reduced until the position of the output member changes so as to minimize the steady-state power dissipation in the motor.

5 Claims, 2 Drawing Sheets

U.S. PATENT DOCUMENTS

| | | | |
|---|---|---|---|
| 5,038,090 A * | 8/1991 | Kawabata et al. | 318/721 |
| 5,416,397 A * | 5/1995 | Mazzara et al. | 318/696 |
| 5,497,063 A * | 3/1996 | Day et al. | 318/610 |
| 5,886,491 A * | 3/1999 | Yoshida et al. | 318/592 |
| 6,052,252 A * | 4/2000 | Kim | 360/78.09 |
| 6,107,771 A * | 8/2000 | Maeda | 318/630 |
| 6,211,636 B1 * | 4/2001 | Matsubara et al. | 318/434 |
| 6,541,937 B1 * | 4/2003 | Kato | 318/727 |
| 6,597,146 B1 * | 7/2003 | Rehm et al. | 318/632 |
| 6,650,078 B1 * | 11/2003 | Chaffee | 318/630 |
| 2003/0090231 A1 * | 5/2003 | Yoshimoto et al. | 318/635 |
| 2003/0184252 A1 * | 10/2003 | Takamune et al. | 318/632 |

* cited by examiner

METHOD OF CONTROLLING A HIGH-FRICTION ELECTRO-MECHANICAL SERVO-MECHANISM TO MINIMIZE THE POWER NEEDED TO HOLD A LOADED OUTPUT MEMBER

TECHNICAL FIELD

The present invention relates generally to the field of electromechanical servo-mechanisms in which an output member, such as a shaft connected to a motor through a high-friction transmission mechanism, is used to move and hold a variable load. In one application, the servomechanism is used to control an aerodynamic load, such as a flap, which is a function of air speed and deflection angle.

BACKGROUND ART

It is well known that certain flight control surfaces, such as flaps, can be moved into and out of an airstream. The aerodynamic load on the flap is a function of the air speed and the flap deflection angle. When the flap is extended into the airstream, the aerodynamic load opposes the desired direction of flap movement. On the other hand, when the flap is retracted from an extended position, the aerodynamic load will "aid" the direction of flap movement.

Flaps have previously been actuated by electro-hydraulic servosystems. They have been actuated by three-phase DC servomotors acting through planetary gearing. One problem with this is that power must be continuously supplied to the motor for such time as the flap is extended into the airfoil surface. This represents a continuous power consumption, even though it is simply desired to hold the flap in a particular position for a period of time.

Accordingly, it would be generally desirable to reduce the power dissipated in an electric motor when it is desired to maintain a position under a constant load condition.

DISCLOSURE OF THE INVENTION

The present invention relates to improved methods for minimizing the steady-state power dissipation in an electro-mechanical servoactuator that is required to maintain a position under a constant load condition. A typical example of such an application is the drive system for an aircraft flap. The drive system is required to displace the flap against an aerodynamic load, which is a function of airspeed and deflection angle. Such a system is typically composed of a three-phase DC servomotor arranged to drive several distributed planetary gearing actuators through a line-shaft. The high-ratio planetary gears exhibit high friction under load. As a result, it is necessary to over-design the motor to drive against the friction as well as to move the aerodynamic load.

The present invention defines multiple strategies for minimizing the steady-state current supplied to the motor, and the associated heat dissipation in the motor. The current-reducing strategies are based on recognition of the inherent behavior of the mechanism, and implementation of methods for taking optimum advantage of it. As noted above, electromechanical servodrives for aircraft flap systems typically have high-ratio gear reducer mechanisms which have significant load-induced friction. When moving against a typical aerodynamic load, this friction is seen as an added load by the motor (i.e., an "opposing" load situation). However, when moving away from the load (i.e., in the so called "aiding" load condition, as when a flap is retracted), the friction opposes the external load and helps to reduce the load seen by the motor. When the servomechanism is required to hold a fixed position, the motor torque and related current can be minimized if the desired position is reached by moving away from the load or "backing away" the position command so that the current is reduced without allowing the load to move significantly. In addition, steady-state power dissipation in a multi-phase motor may be further optimized by shifting the position command until the current in one phase is zero, and the current in the other two phases are equal. There can be a further significant advantage, from a heat dissipation standpoint, to a timed distribution of holding current among the three phases, whereby the zero current phase may also be time-sequenced. The invention thus consists of implementing an automatic method to satisfy all of these conditions simultaneously.

With parenthetical reference to the corresponding parts, portions or surfaces of the disclosed embodiment, merely for purpose of illustration and not by way of limitation, the present invention, in one aspect, broadly provides an improved method of controlling an electro-mechanical servomechanism (20) for moving an output member relative to a variable load (38). The mechanism broadly includes a motor (37) having at least one coil (32A, 32B or 32C) adapted to be supplied with current, and having a rotor (33) with an output shaft (35); a transmission mechanism (36) arranged between the output shaft and the load, the transmission having a mechanical friction related to the load; a servoamplifier (30) arranged to supply current to the motor coil in response to an input signal; a command signal (in line 21) for commanding the position of the load; a load position feedback signal (in line 23) compared to the command signal (in summing point 22) and arranged to produce an error signal (in line 24); and means (28) for generating an offset signal (in line 26) that is summed with the error signal (in summing point 25) to modify the servoamplifier input signal (in line 29). In this aspect, the improved method comprises the steps of: generating the offset signal as a function of the command and feedback signals and the current supplied to the motor coil after the position of the output member has remained substantially constant for a predetermined time; and adjusting the offset signal so that the motor current is reduced until the position of the output member changes so as to minimize the steady-state power dissipation in the motor. According to this aspect, the current may be either direct, alternating or pulse-width-modulated.

In another aspect, the invention provides an improved method of controlling an electromechanical servomechanism (20) from moving an output member relative to a variable load (38). In this aspect, the mechanism includes: a motor (37) having a plurality of coils (32A, 32B, 32C) adapted to be supplied with currents and having a permanent magnet rotor (33) with an output shaft (35); a mechanical transmission (36) arranged between the output shaft and the load, the transmission having a mechanical friction related to the load; a servoamplifier (30) arranged to supply currents to the motor coils in response to an input signal; a command signal (in line 21) for commanding the position of the load; a load position feedback signal (in line 23) compared (in summing point 22) to the command signal and arranged to produce an error signal (in line 24); and means (28) for generating an offset signal (in line 26) that is summed (in summing point 25) with the error signal to modify the input signal (in line 29) supplied to the servoamplifier. In this aspect, the improved method comprises the steps of: generating the offset signal as a function of the command and feedback signals and the current supplied to the motor coil after the position of the output member has remained substantially constant for a predetermined time; and adjusting the offset signal such that the servoamplifier input signal will be modified so as to minimize the steady-state power dissipation in the motor.

In another aspect, wherein the motor is a multi-phase direct-current motor, the offset signal may be adjusted so the sum of the motor currents is reduced until the load position changes. The offset signal maybe further adjusted so that one of the multi-phase motor currents is reduced to zero, and so that a second of the motor currents is subsequently reduced to zero.

Accordingly, the general object of this invention is to provide an improved method of controlling an electromechanical servomechanism for moving an output member relative to a variable load.

Another and more specific object is to provide an improved method for reducing the power dissipation in a motor that is operatively arranged to hold a flap surface in an extended position in an airstream.

These and other objects and advantages will become apparent from the foregoing and ongoing written specification, the drawings, and the appended claims.

DESCRIPTION OF THE PREFERRED EMBODIMENTS

Figure 1:
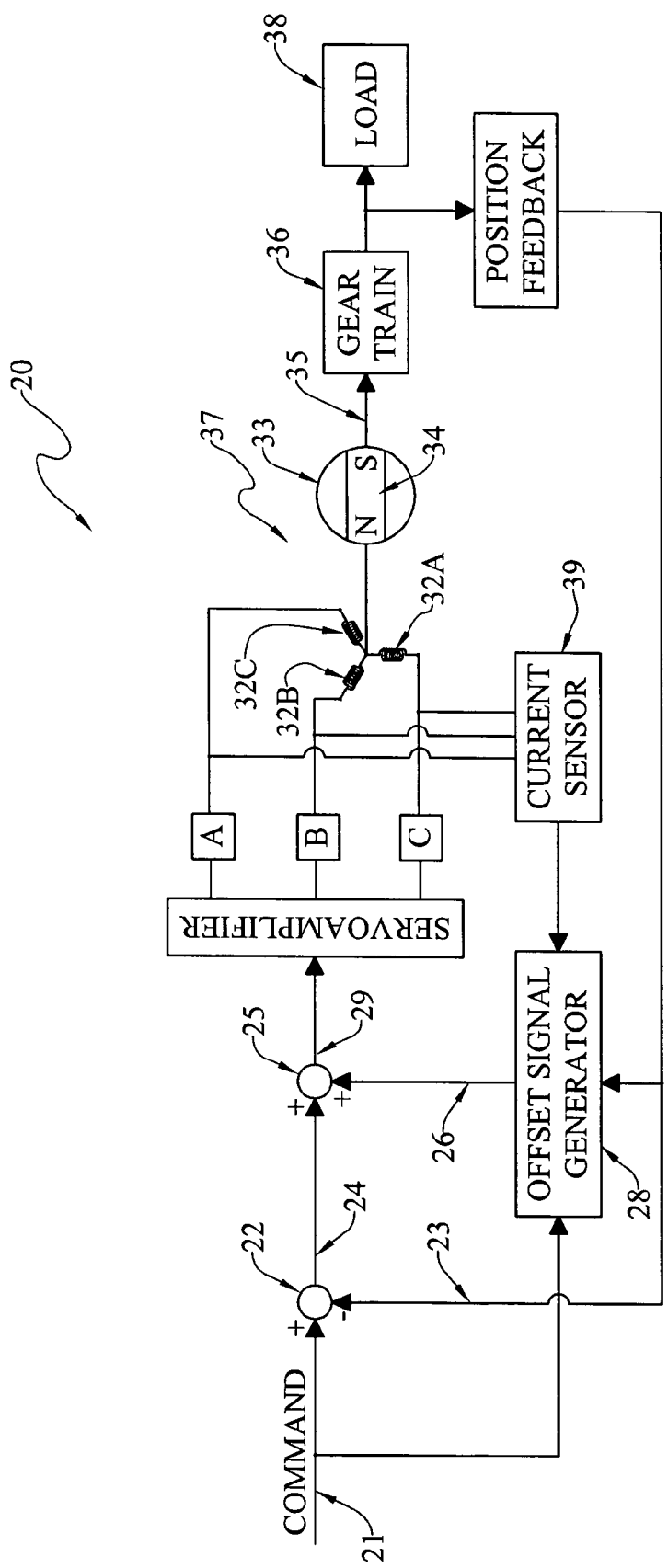
FIG. 1 is a block diagram showing a presently-preferred form of the improved electromechanical servomechanism.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings and, more particularly, to FIG. 1, an improved servomechanism is generally depicted at 20.

A command signal is supplied on line 21 to a summing point 22, which receives a load position feedback signal via line 23. The command signal is normally positive and the feedback signal is normally negative. These two signals are algebraically summed in summing point 22 to provide an error signal on line 24. The error signal is provided to a second summing point 25, which receives an offset signal via line 26 provided by offset signal generator 28. The offset signal in line 26 is summed with the error signal in line 24, and an offset-modified error signal is provided in line 29 to servoamplifier 30. The servoamplifier is arranged to provide current via switches A, B, C to coils 32A, 32B, 32C, respectively, of a three-phase DC motor, generally indicated at 37. The motor is depicted as having a rotor 33 provided with a permanent magnet 34. An output shaft, represented by dashed line 35, is arranged to couple the output of the rotor to a planetary gear train 36 which is operatively arranged to move an output member, such as a flap, relative to an airstream. This variable load is represented by box 38. The position of the load is sensed and is fed back to summing point 22 via line 23.

A current sensor, indicated at box 39, is operatively arranged to sense the currents supplied to coils 32A, 32B and 32C, and is arranged to provide input signals to offset generator 28. The command and position feedback signals are also provided to offset signal generator 28. The offset signal represented in line 26 is generated by generator 28 as a function of the command and feedback signals, as well as the currents supplied to the motor coils.

In operation, when the servomechanism is required to hold the output member at a fixed position under an opposing load for an extended period of time, the offset generator is programmed to initiate a power-reducing adjustment after the output member has been held stationary for a predetermined period. The offset signal 26 is then adjusted to gradually reduce the amplifier input signal until the output signal is observed to just begin to change. By these steps, the transmission friction would offer the greatest resistance to motion, and thus provide maximum assistance in holding the load, thereby reducing the motor power dissipation.

In the case of the three-phase direct-current motor illustrated in the drawings, the heat dissipation in the motor can be further optimized by shifting the relative phases of the winding currents.

Figure 2:
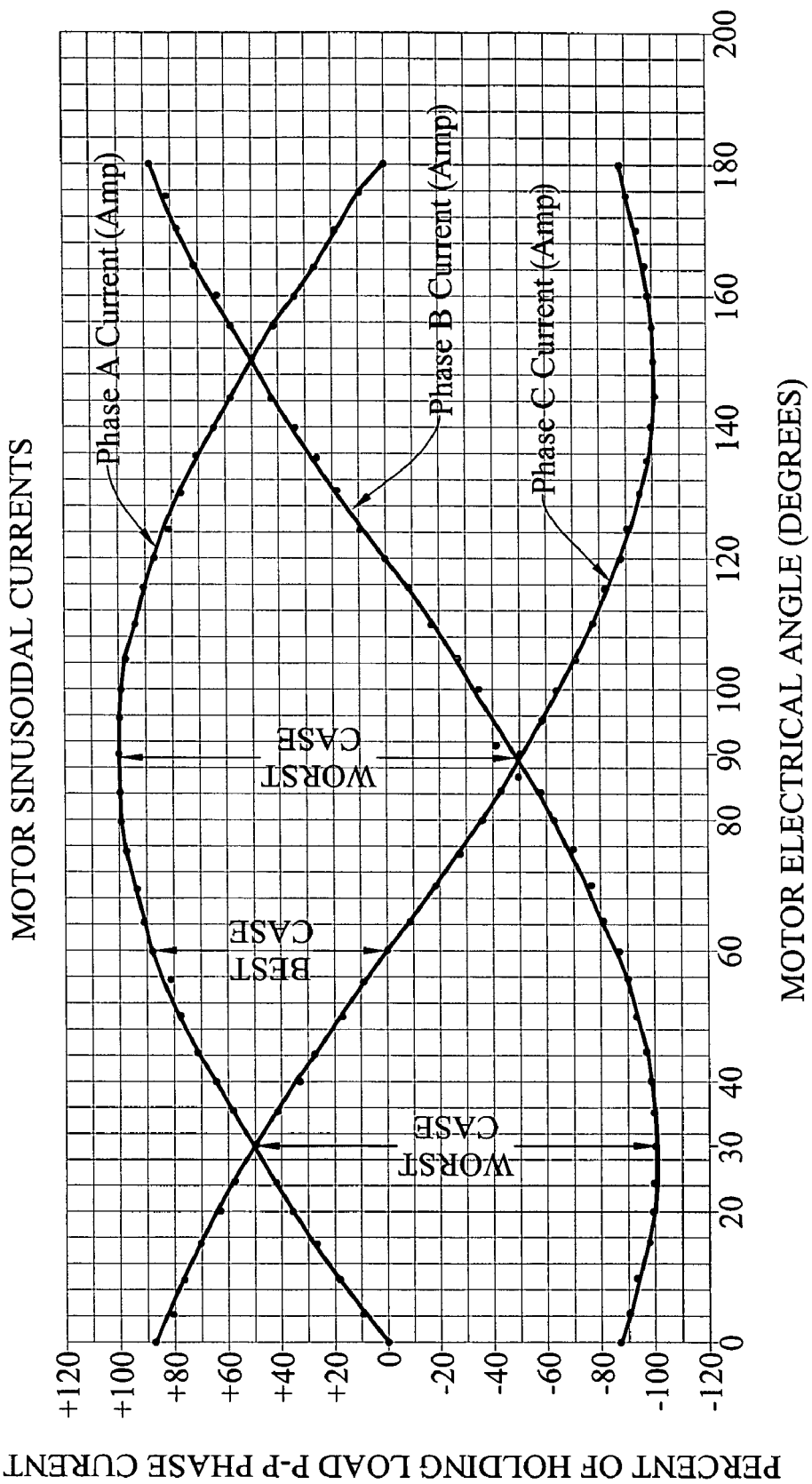
FIG. 2 is a plot showing percent of holding load phase current (ordinate) versus motor electrical angle (abscissa).

FIG. 2 is a plot of the three-phase sinusoidal currents supplied to the motor windings versus motor rotor electrical angle, on a per unit basis. This would be typical of a sinusoidally-commutated three-phase motor, though the analysis would be similar for trapezoidal or six-step commutation or for other poly-phased designs. From FIG. 2, it can be seen that if the motor is stopped and is holding a load at an electrical angle of 0°, 60°, 120°, 180°, . . . , etc., then two of the three phases are carrying 86% of the maximum phase current required to hold the motor, while the third phase is carrying no current at all. This is the best condition for a conventional motor control in that two phases are taking the total thermal load.

By contrast, if the rotor is taking a load at 30°, 90°, 150°, . . . , etc., then one phase will be taking the peak phase current required to hold the load, while the other two phases are taking only half this current. This is the worst thermal case in that one phase is taking fully half of the thermal load to the motor.

One approach to reducing winding heating during holding mode is to superimpose a repeating waveform onto the offset signal that causes the motor to shift back and forth periodically through a stroke of 180 electrical degrees. With typical electric actuation systems, the system overall gear ratio is sufficiently high, and the motor pole count is also sufficiently high, as to make the resulting superimposed position error negligible. The position of this waveform would be calculated to minimize the overall power requirements and current distribution error and would be a function of the maximum required holding load, holding time, and winding thermal time constant.

Modifications

The present invention expressly contemplates that many changes and modifications may be made. For example, the improved method is not necessarily limited to a three-phase DC motor provided with a permanent magnet rotor. Other types of servoamplifiers, motors and gear trains could be utilized. Moreover, the invention is not limited to the particular flap-controlling end usage disclosed in the specification.

Therefore, while a presently preferred form of the improved method is shown and described, and several modifications thereof discussed, persons skilled in this art will readily appreciate that various additional changes and modifications may be made without departing from the spirit of the invention, as defined and differentiated by the following claims.

What is claimed is:

1. The method of controlling an electromechanical servomechanism for moving an output member relative to a variable load, said servomechanism including:
    a motor having a plurality of coils adapted to be supplied with currents and having a permanent magnet rotor with an output shaft;
    a mechanical transmission arranged between said output shaft and said load, said transmission having a mechanical friction related to said load;
    a servoamplifier arranged to supply currents to said motor coils in response to an input signal;
    a command signal for commanding the position of said load;
    a load position feedback signal compared to said command signal and arranged to produce an error signal; and
    means for generating an offset signal that is summed with said error signal to modify the input signal supplied to said servoamplifier, said offset signal generating means comprising the steps of:
    generating said offset signal as a function of said command and feedback signals and the currents supplied to said motor coils after the position of said output member has remained substantially constant for a predetermined time; and
    adjusting said offset signal so that the sum of the motor currents is reduced until the load position changes such that said servoamplifier input signal will be modified so as to minimize the steady-state power dissipation in said motor.

2. The method as set forth in claim 1 wherein said current is alternating.

3. The method as set forth in claim 1 wherein said current is pulse-width-modulated.

4. The method as set forth in claim 1 wherein said offset signal is further adjusted so that one of the motor currents is reduced to zero.

5. The method as set forth in claim 4 wherein said offset signal is further adjusted so that a second of the motor currents is reduced to zero.

* * * * *